US008862592B2

(12) United States Patent
Bottum et al.

(10) Patent No.: US 8,862,592 B2
(45) Date of Patent: *Oct. 14, 2014

(54) SYSTEMS AND METHODS FOR GRAPHICAL SEARCH INTERFACE

(71) Applicant: Swoop Search, LLC, Stillwater, MN (US)

(72) Inventors: Quinn Colton Bottum, Stillwater, MN (US); Michael Christopher Bottum, East Troy, WI (US); Paul William Bottum, Stillwater, MN (US)

(73) Assignee: Swoop Search, LLC, Stillwater, MN (US)

( * ) Notice: Subject to any disclaimer, the term of this patent is extended or adjusted under 35 U.S.C. 154(b) by 40 days.

This patent is subject to a terminal disclaimer.

(21) Appl. No.: 13/730,844

(22) Filed: Dec. 29, 2012

(65) Prior Publication Data

US 2014/0074862 A1    Mar. 13, 2014

Related U.S. Application Data

(63) Continuation-in-part of application No. 13/346,730, filed on Jan. 10, 2012, now Pat. No. 8,694,513.

(51) Int. Cl.
*G06F 17/30* (2006.01)

(52) U.S. Cl.
CPC .... *G06F 17/30864* (2013.01); *G06F 17/30867* (2013.01)
USPC ........................................................ 707/748

(58) Field of Classification Search
CPC combination set(s) only.
See application file for complete search history.

(56) References Cited

U.S. PATENT DOCUMENTS

| 8,001,152 | B1  |   | 8/2011  | Solan |
|---|---|---|---|---|
| 8,275,446 | B2 | * | 9/2012  | Vining et al. ................. 600/425 |
| 8,363,972 | B1 |   | 1/2013  | Silver et al. |
| 8,429,153 | B2 |   | 4/2013  | Birdwell et al. |
| 2004/0229290 | A1 | * | 11/2004 | Hellinga et al. ............... 435/7.1 |
| 2005/0055341 | A1 |   | 3/2005  | Haahr et al. |
| 2006/0204107 | A1 | * | 9/2006  | Dugan et al. .................. 382/217 |
| 2006/0235841 | A1 |   | 10/2006 | Betz et al. |
| 2007/0179946 | A1 |   | 8/2007  | Wissner-Gross |
| 2008/0243774 | A1 | * | 10/2008 | Jaspers et al. ..................... 707/3 |

(Continued)

OTHER PUBLICATIONS

Matthew Hurst, "Data Mining: Text Mining, Visualization and Social Media: How Hard is the Local Search Problem?," Aug. 29, 2011, http://datamining.typepad.com/data_mining/2011/08/how-hard-is-the-local-search-problem.html.

(Continued)

*Primary Examiner* — Shyue Jiunn Hwa

(74) *Attorney, Agent, or Firm* — Bookoff McAndrews, PLLC

(57) ABSTRACT

Some embodiments of the present disclosure provide a graphical user interface as a means of inputting search parameters to database search engines. In some embodiments, two or three dimensional projections spatially represent relationships between search parameters, located along the periphery of the projections and search hits whose significance are represented by position relative to the center of the projection and comparative distance from each of the search parameters. As the user manipulates the overall shape of the search projection, the weighting of search parameters adjusts, reconfiguring the search. The present disclosure also provides, in some embodiments, an intuitive means of assimilating search parameter weightings based on peer or social network preferences with global search results. Finally, the present disclosure provides a means of using search output itself as an input for refinement of search.

22 Claims, 8 Drawing Sheets

(56) References Cited

U.S. PATENT DOCUMENTS

| | | |
|---|---|---|
| 2009/0006356 A1 | 1/2009 | Liao et al. |
| 2009/0254537 A1 | 10/2009 | Yoshio et al. |
| 2011/0029514 A1 | 2/2011 | Kerschberg et al. |
| 2011/0258184 A1 | 10/2011 | Liao et al. |
| 2013/0103680 A1* | 4/2013 | Arrasvuori .................... 707/728 |

OTHER PUBLICATIONS

Christopher D. Manning et al., "An Introduction to Information Retrieval," Cambridge University Press, Ch. 19, Apr. 1, 2009, http://nlp.stanford.edu/IR-book/pdf/19web.pdf, pp. 421-442.

Mona Taghavi et al., "An Analysis of Web Proxy Logs with Query Distribution Pattern Approach for Search Engines," Journal of Computer Standards & Interfaces, vol. 33, Issue: 6, Jan. 2012, pp. 162-170.

* cited by examiner

SYSTEMS AND METHODS FOR GRAPHICAL SEARCH INTERFACE

PRIORITY

This continuation-in-part application claims the benefit of priority to U.S. patent application Ser. No. 13/346,730, filed on Jan. 10, 2012, now U.S. Pat. No. 8,694,513, issued Apr. 8, 2014.

FIELD OF THE INVENTION

The present disclosure is directed towards providing an intuitive means of representing and manipulating the weightings of search parameters employed by database search algorithms.

BACKGROUND

That we are awash in information is an often used, though certainly correct axiom of the early 21st century. The ubiquity of information access portals in everyday life provides the potential for connecting meaning to any experience or data set. Potential meaning is the key tenant here. How information sets are evaluated sorted and searched, remains the ultimate determinant of their actual value to the user.

Information in this modern sense may be considered as a two component entity; the first being the actual data it embodies, the second being its accessibility, based on identifying tags, anchors, or fields.

The exponential increases in both data production and storage capabilities have matched, not surprisingly, very well since "Moore's Law" tales have circulated through computational communities. Data search technologies, how information is sorted and accessed, however, have experienced a much more varied history. Though the success of market leaders' search algorithms, such as Google's "page-rank," belie their effectiveness, the increasing volume and complexity of modern information structure has lead to increased user dissatisfaction and frustration. Three significant points of current search algorithm dissatisfaction are search output discrepancies, search output bias, and an incongruous match of search interface with brain heuristic functioning.

Search output discrepancies may result from a circumstance referred to as the "local search problem." This problem arises when global data sets containing extrinsic information are not consistently cross checked or "curated" with local data sets containing intrinsic information. For example, a search for vacation destinations may yield inconsistent output if not updated with local information such as prices, business hours and patron ratings.

As search engine and social networking leaders battle the concept of truth and validity on the internet, a potential problem looms for society as a whole. The popularity of social networking sites has made searching within peer preference databases very effective and appealing. A search conducted within a social network database consisting of peers with similar preferences (intrinsic data) is highly likely to produce user preferable results. Such a behavior (searching within closed data sets), however, limits variation by culling preference outliers. As in biology, any system lacking diversity, while successful within its native context, is resistant to change, slow to adapt, and quickly expends its resources.

Search output bias may result primarily from either (1) discontinuities in search parameters weightings between the user and the search algorithm, or (2) misguiding parameter weightings through "search engine optimization" practices. In either case, miscommunication or lack of clear communication between user input and search algorithm programming may skew output away from the user's intentions.

Addressing the third point of search algorithm dissatisfaction, search is a learning process. Psychological studies of our mind's processing methods maintain that we gather, interpret, and organize stimuli based on heuristic, information seeking behaviors. Schemas, or information frameworks, drive these behaviors and are in turn reshaped in a feedback relationship with them. Schemas contain impressions and rules of thumb that are based on collective experiences and importantly are unique to the individual. Schemas, then, ultimately define the individualistic nature of understanding within our species. Given this perspective of understanding, and for the purpose of the present discussion on search, a concept—something thought to be "understood"—may be compared to what is known as an object in programming languages, such as JavaScript. An object's significance, in this sense, is determined by parameters such as "data type", "length", "location", etc.

On the output side of current search practices, in seeking to model the effectiveness of this heuristic-schema relationship, today's search algorithms employ data frequency, data proximity, and hardcoded database information to create and shape accurate results. These strategies do result in heuristic-like search behavior, though the schema upon which they rely are ultimately based on most common or most statistically probable search parameter to search result relationships, not on the user's experiential knowledge or contextual intent.

The input side of current search interfaces interact poorly with the processing methodology of our brain. Currently, search is guided by a serial step-by-step process. The user attempts to convert a search concept to a string of terms (hoping to characterize the concept), enters the terms, sorts through the search output, and possibly re-enters terms. This strategy works well for navigational searches where pre-conceptualized output, such as a web page or a phone number, is sought. For informational searches, such as for "good restaurants", "comfortable apartments", or "a person like this friend", current search interfaces fall far short of providing timely accurate output for the user. Recent studies have shown that informational searches and the length of search queries for them are growing more rapidly than any other type of search.

In order to match our minds' organized discovery process and experiential knowledge structure, why not allow for the input and modeling of the search concept itself? For example, if searching for a "person like a friend", why not use the friend itself as the object that drives the search? The search object could be represented as a coordinate system whose boundary is composed of parameters defining the object (e.g. a friend's parameters might be "gender", "age", etc.). Given this representation, the magnitude and direction of vectors connecting object parameters would translate to a weight or significance of that parameter. Collectively all parameters, weighted appropriately, would compose the object's search query string. Additionally, manually manipulating a parameter location within the coordinate space could adjust its relative weight in the overall search query string.

Through this process, search would more closely match the mind's heuristic behavior of obtaining, classifying, and presenting information. It would allow a more intuitive graphical representation of the multi-dimensional information structure used to drive decision making processes. It should speed the search process by maintaining a multi-dimensional view of the critical characteristics that are intended to guide the search. It may also enable a more exhaustive search due to the graphical sensitivity.

There exists an apparent need for an interface between user and search algorithms which would allow the joining of discontinuous data sets, an intuitive means of user awareness and manipulation of search parameter weightings, as well as an effective means of searching across intrinsic and extrinsic data sets.

Finally, the search interface described herein provides an intuitive and fundamentally more accurate means for image search. As today's information schema become increasingly graphically structured, a need arises to be able to search within this graphical landscape. Currently, image search requires a series of translations, such as from user cognition to language representation, from language representation to image meta-tag searching, and from image meta-tag searching to search results structuring. Each one of these translational steps introduce a degree of error, distancing the original intent from search output. From an operational perspective, this disconnect between intent and output introduce an unaddressed need at two levels. One, the user either is not connected with the most accurate solution to their search, or must take additional time to search. Two, information providers, observing user search behavior, will misinterpret the user's behavior-intent relationship, and thus inaccurately addressing the user's needs or preferences.

BRIEF SUMMARY

The present disclosure provides a graphical interface between a user and a database search algorithm or search engine. The interface provides the user an intuitive visualization of search parameter weighting hierarchy, as well as a means to manually reconfigure the weighting hierarchy.

The graphical interface symbolically projects the parameter weighting hierarchy as a two or three dimensional "search space," whose center represents optimal search output. The shape of the "search space" is found to have 'n' vertices representing the 'n' parameters employed in the search. The relative distances of parameter vertices to the space center represent the relative weightings or importance of each parameter in the overall search.

As a search is initiated, vertices are determined and populated either through search engine suggestions, default settings, or user definitions. Initially, all parameters are weighted equally, represented as a radially symmetric shape about the optimal search output.

The interface presents the user the capability of reconfiguring the search by dragging individual parameters toward (increasing weight), away from (decreasing weight), or completely away from (eliminating parameter) the shape center. As the shape is manipulated in this fashion, optimal search results are updated in real time.

Additionally, the interface allows the user to simultaneously examine multiple data sets, searching for intersection by joining parameters common to each set, or union by joining "search spaces" of each set.

Finally, the interface allows whole entities, such as images, "friends", or socially shared media, to be used as search parameters which may either collectively defined by their set of tagged data, or user defined through selection of pertinent values the search parameters might represent.

DETAILED DESCRIPTION

It should be noted from the outset that the graphical user interface consistent with the present disclosure, and as explained in this description, may be employed with any database search algorithm or search engine capable of examining multiple search parameters in determining optimal match output.

The capability of the presently disclosed graphical search interface of visualizing and reorienting search engine output as specified by the user's goals, preferences, and needs can be illustrated through using a search for 'summer vacations' as an example.

Figure 1:
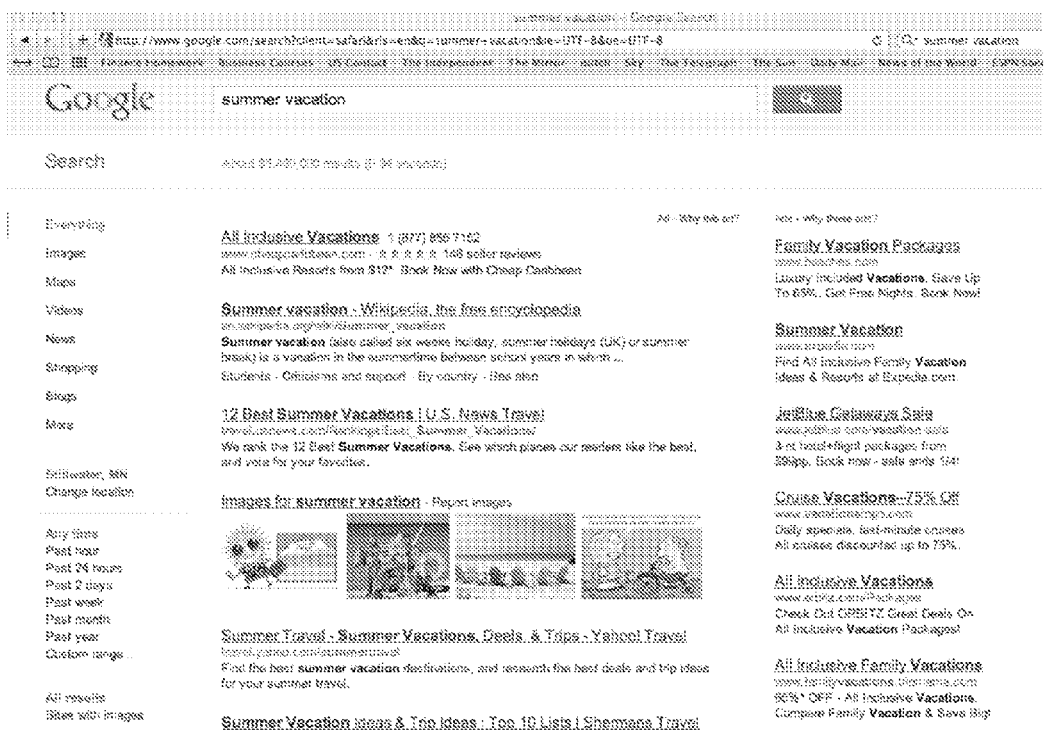
FIG. 1 depicts one example of a typical search engine output.

As an example, suppose the user intends to search for summer vacation possibilities using Google's search engine. Results for a search of 'summer vacation' would output a tabulated list (FIG. 1).

Figure 2:
FIG. 2 depicts one example of a typical search engine related search suggestions output.

This output presents two issues that the invention addresses. One, it is impersonal in the sense that it is a generic output that does not adequately address the user's personal goals, preferences, or needs. Two, it displays the output in a list of hyperlinks; potentially requiring the user to scan pages of information. Additionally, the related searches that Google produces at the bottom of the initial search output page are numerous and call for extensive cross referencing of search output lists in order to determine optimal results (FIG. 2).

Figure 3:
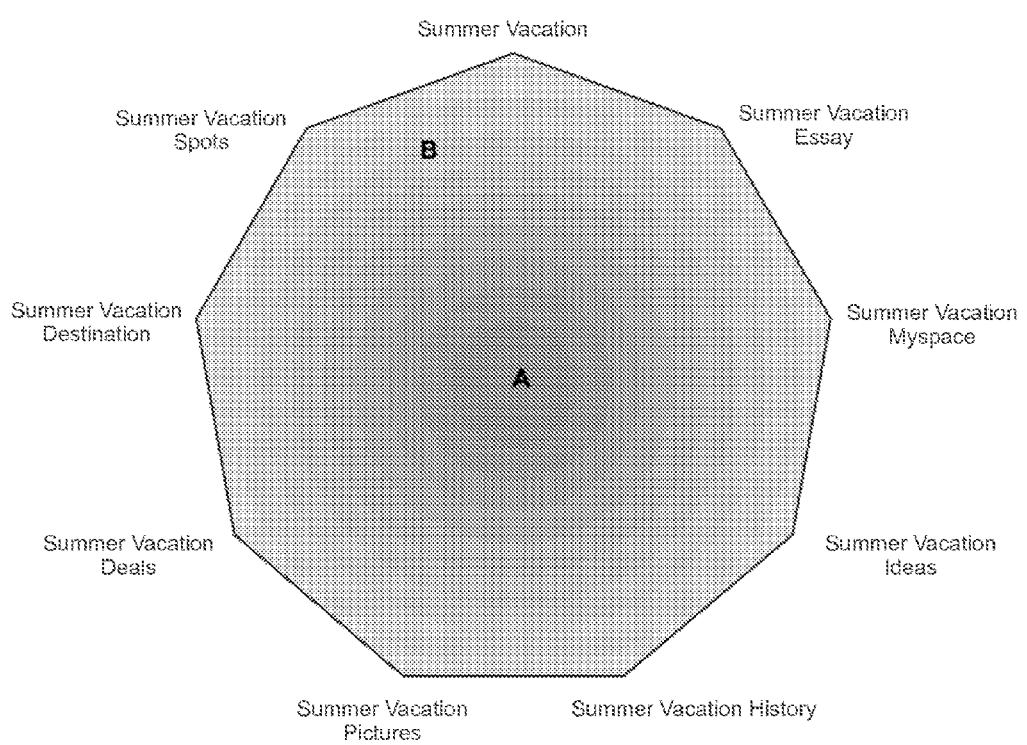
FIG. 3 depicts an exemplary "search space" two-dimensional projection with vertices populated with search suggestion output, e.g., a search for summer vacations, consistent with the presently disclosed graphical search interface.
Figure 4:
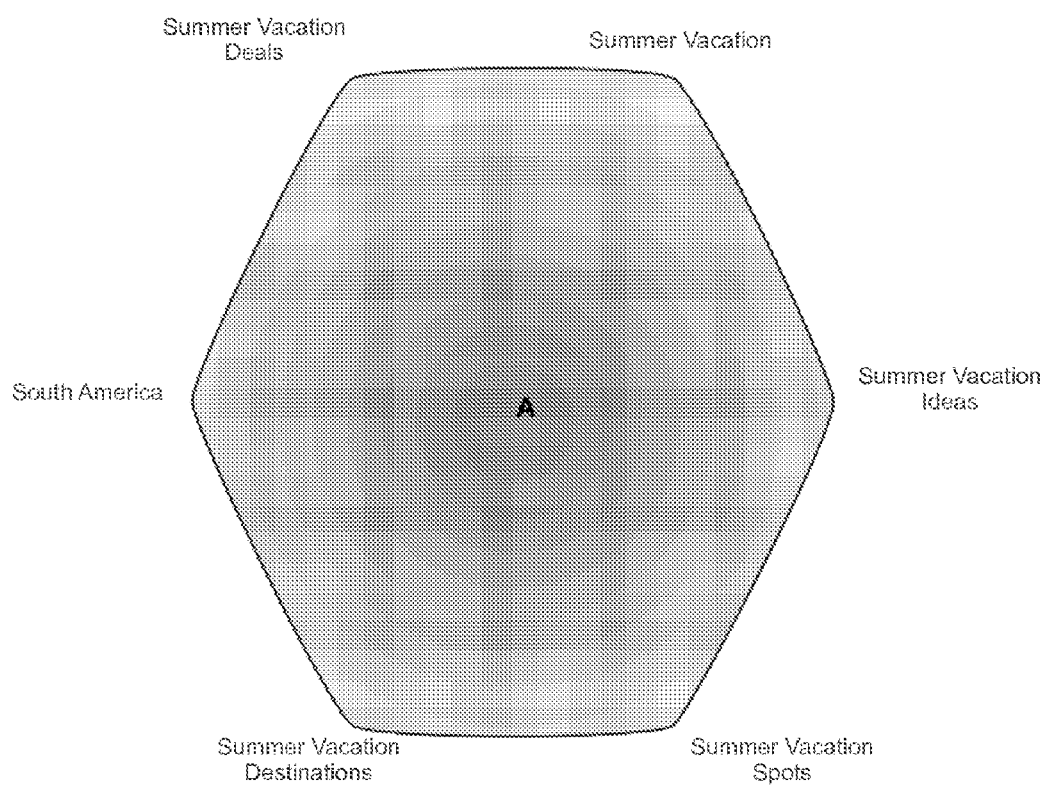
FIG. 4 depicts an exemplary reconfigured graphical "search space" projection, e.g., a reconfigured graphical "search space" to reflect the elimination of parameters, consistent with the presently disclosed graphical search interface.

The presently disclosed graphical search interface would provide the following graphical output immediately after the initial search parameter was entered as represented in FIG. 3. This initial graphical output projects a radially symmetric search space shape whose vertices are populated with the initial search parameter along with all related searches that are generated (FIG. 3). Each vertex, then represents a search parameter. The maximum and minimum number of search parameters may be default or user defined (FIG. 4). Contained within the search space shape is a matrix of hyperlinks related to all parameters. A given hyperlink's coordinates inside the search space are determined by its relevance to the search parameters. Nearer proximity represents higher relevance between hyperlink and search parameter. The middle region of the search space represents search output generated by equally weighting all search space parameters. Thus the center of the search space represents an optimal hit subset, most equally relevant to all search parameters—labeled 'A' in FIG. 3.

Figure 5:
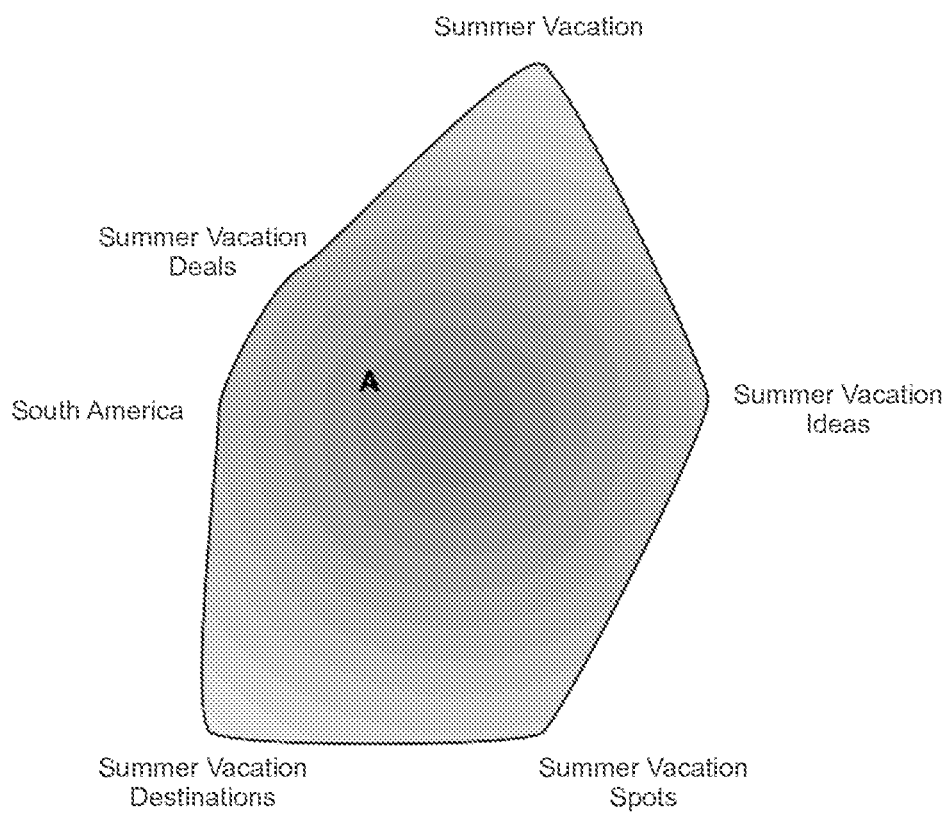
FIG. 5 depicts an exemplary reconfigured graphical "search space" projection weighting, e.g., "Summer Vacation Deals" and "South America" with greater weightings, consistent with the presently disclosed graphical search interface.

In order to view a hyperlink contained within the graphic, the user simply highlights the point on the graphic that is in tune with his/her goals, preferences, and needs, and the interface will display a list of hyperlinks common to that search region. If the initial search space output does match the user's intentions, the interface presents the user the capability of reconfiguring the search by dragging individual parameters toward (increasing weight), away from (decreasing weight), or completely away from (eliminating parameter) the shape center (FIG. 5). As the search space dimensions are reconfigured, its coordinate system is continually repopulated with the updated the hyperlink matrix. In this way, the presently disclosed graphical search interface allows for users to intuitively perform a search in unison with their mental criteria for what a successful search will generate.

It should be noted at this point that two parameter weighting modes exist within the presently disclosed graphical search interface; absolute weighting and relative weighting. In the absolute weighting mode, only a parameter's relative radial distance to the center of the search space or highlighted region is compared to the radial distance of other parameters. This mode enables quicker searching since the actual order of parameters about the search space perimeter does not factor into the overall search. In relative weighing mode, the search weight of a parameter is determined by its radial distance to the search space center, as well as distances to all other search parameters. This mode may require shuffling of parameter order, requiring additional interface time, though producing higher user intent to search output correlation.

Figure 6:
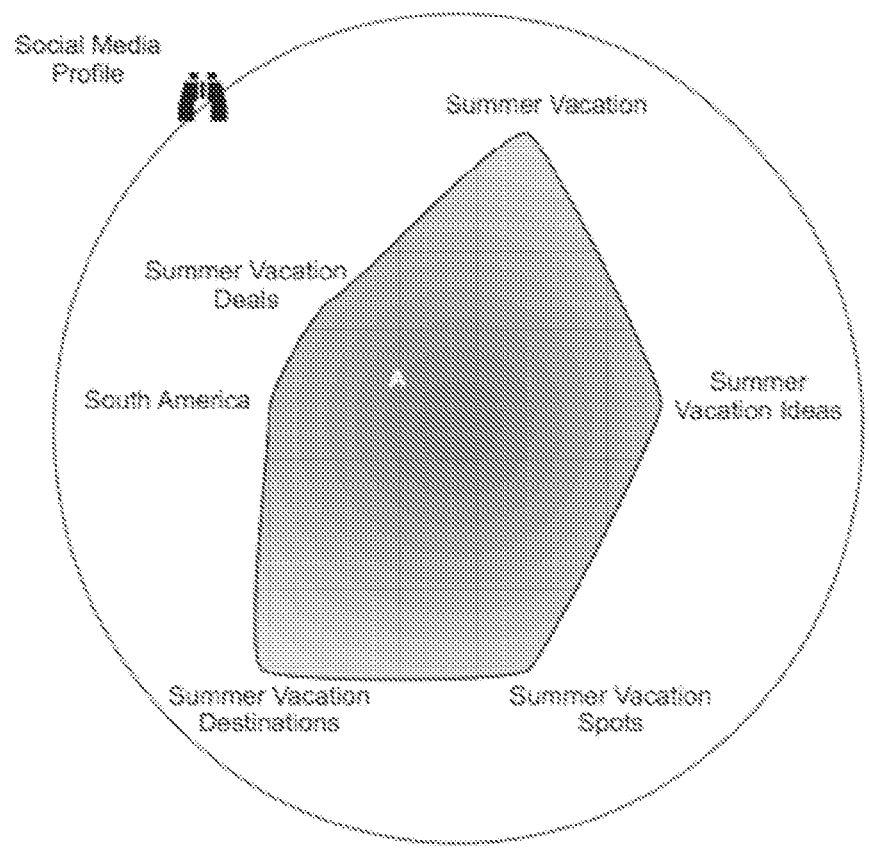
FIG. 6 depicts an exemplary "search space" projection weighting, e.g., summer vacation with social network profile applied in 'search within' mode, consistent with the presently disclosed graphical search interface.
Figure 7:
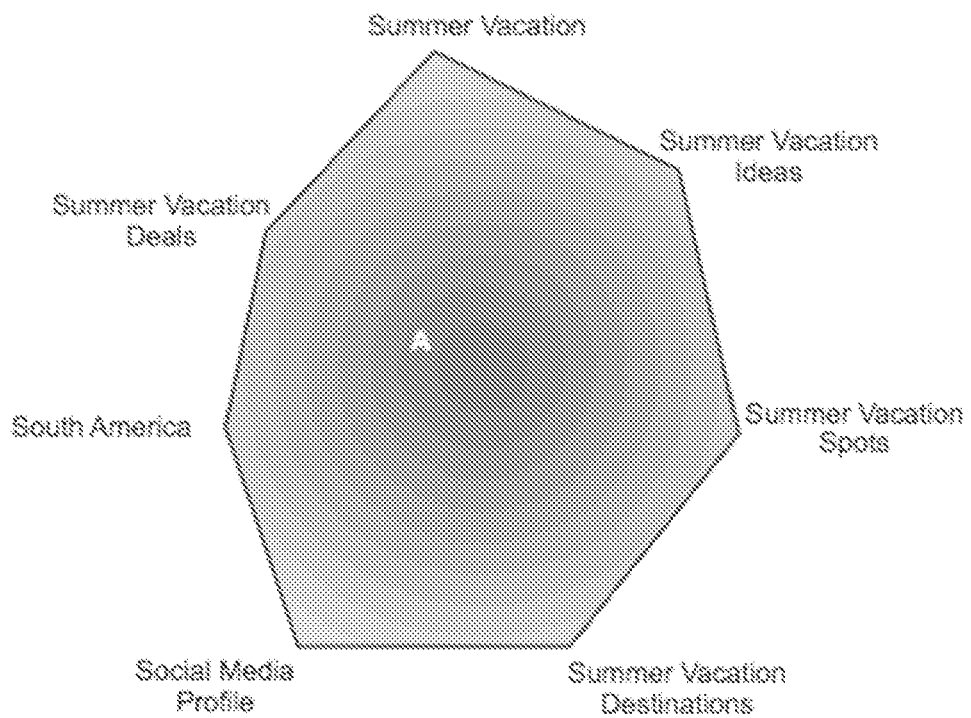
FIG. 7 depicts an exemplary "search space" projection weighting, e.g., summer vacation with social network profile applied in 'search beyond' mode, consistent with the presently disclosed graphical search interface.

Additionally, the presently disclosed graphical search interface provides a means for the user to intuitively perform searches across seeming non-compatible data bases. Comparing value preferences of a user's social network database, loosely considered intrinsic data, with extrinsic data sets, such as lists of films offered through a video streaming website, may be performed as follows with the presently disclosed graphical search interface. Suppose the user would wish to conduct a search looking for a film based on how his social network preferences would value each of the search space initial search parameters; say, thriller films, foreign films, and films produced before the year 2000. To engage this 'search within' protocol, the user would simply encircle the graphical search space with the user's social network icon to search for hits within the network preferences (FIG. 6), such as within social network databases such as Facebook and Google+. If, on the other hand, the user wishes to include his/her social network preferences as an additional parameter to the search space, and 'search beyond' profile preferences, he/she would simply drag the social network icon inside of the search space, allowing it to populate along the search space perimeter—currently possible only through performing multiple searches and extensive cross referencing (FIG. 7). In either search, the user's final choice would update his/her value preferences of their network profile. The intricacies of these two search strategies create significant effects on a user's social network profile and, potentially, social behavior. Choices made through the 'search within' protocol, although appealing to the user, and predictable to the marketer, provide no new social fodder, nothing new is added to the behavioral 'gene pool' of the user. Networks of this type become quickly saturated and stale of market potential. The 'search beyond' strategy provides the appeal of including personal preferences, while potentially introducing new information and diversifying social networks. Diverse social networks are more robust, adaptable to change, and provide a greater range of investment opportunities.

Figure 8:
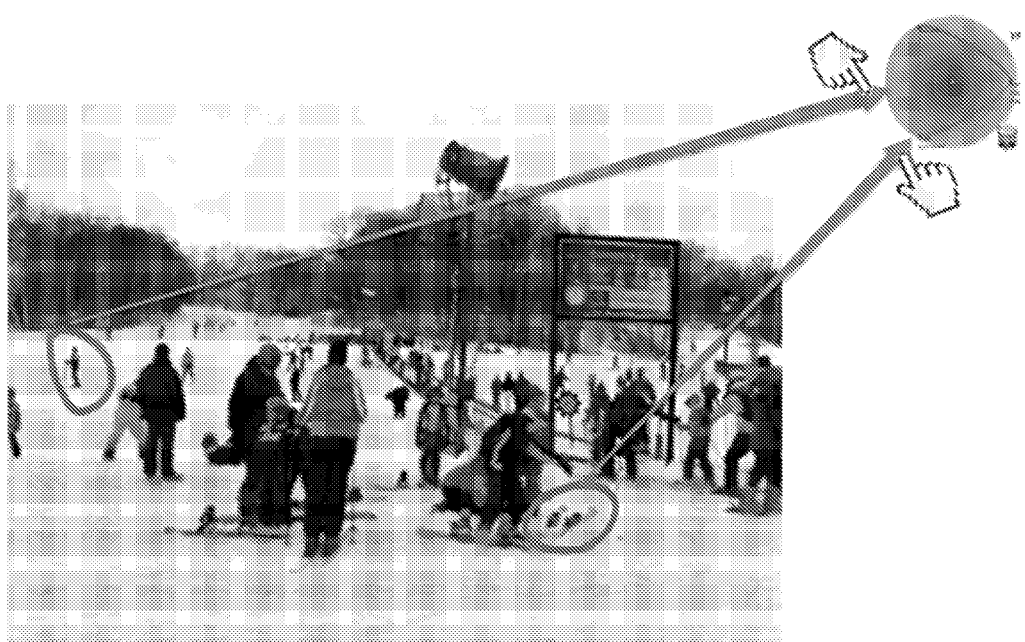
FIG. 8 depicts an exemplary image search using the presently disclosed graphical search interface, e.g., a user identifies objects within an image as pertinent values and drags them to the graphical search interface for weighted search, consistent with the presently disclosed graphical search interface.

Finally, to address the image search challenge discussed above, the presently disclosed graphical search interface proposes the following solution. When characterizing the content of an image, the mind identifies individual objects within that image, and then applies relative importance to those objects based on their spatial and contextual presentation or relationships within the image. Beyond simply searching for objects, an effective image search interface must communicate those relationships. The presently disclosed graphical search interface would allow the user to conduct an object based search using a representative image as a sort of contextual template. The user would simply encircle and drag chosen objects from the representative image to the search interface icon using graphical user interface technologies, such as touch screen or mouse (FIG. 8). For example, a skier and skis have been selected and dragged to the graphical search interface for weighting search, as shown in FIG. 8. The encircled areas would be passed through a series of filters, which characterize the object they contain. Once the search interface had been populated with the characterized objects, their relative weights (search importance) would be manipulated as described above. Object weights could then be cross-referenced with those of previously scanned or tagged images or any other type of data sets producing a hierarchical results list.

The foregoing description has been presented for purposes of illustration and description. It is not intended to be exhaustive or to limit the invention to the precise form disclosed, and other modifications and variations may be possible in light of the above teachings. The embodiments were chosen and described in order to best explain the principles of the invention and its practical application to thereby enable others skilled in the art to best utilize the invention in various embodiments and various modifications as are suited to the particular use contemplated.

The invention claimed is:

1. A computer-implemented method for an interactive graphical search interface, the method comprising:
    identifying, from a search engine database, a plurality of related search parameters based on one or more initial search parameters;
    generating, by a processor, a search space containing a plurality of elements, wherein each of the elements of the plurality of elements corresponds to one of the one or more initial search parameters and plurality of related search parameters, and wherein the plurality of elements allow adjustments to a weighting of one or more of the one or more initial search parameters and the plurality of related search parameters by interacting with one or more of the elements;
    transmitting a graphical interface projecting a representation of the search space; and
    transmitting a plurality of search results automatically updated in real time based on adjustments to the weighting of the one or more initial search parameters and the plurality of related search parameters, wherein each of the plurality of elements is movable toward or away from a center of the search space to adjust the weighting of the one or more initial search parameters and the plurality of related search parameters,
    wherein, initially, one or more of the initial search parameters and the plurality of related search parameters are weighted equally, such that the search space is a radially symmetric shape about an optimal search output.

2. The method of claim 1, wherein distances from the plurality of elements to the center of the search space are initially equal.

3. The method of claim 1, wherein distances between the plurality of elements are initially equal.

4. The method of claim 1, wherein a perimeter of the search space has a plurality of vertices, each vertex of the plurality of vertices representing one of the one or more initial search parameters and the plurality of related search parameters.

5. The method of claim 1, wherein each of the one or more elements is a vertex of a plurality of parameter vertices in the search space, and distances of parameter vertices to the center of the search space represent the weighting of each of the one or more initial search parameters and plurality of related search parameters.

6. The method of claim 1, wherein the center of the search space represents an optimal search output.

7. The method of claim 1, further comprising:
enabling a user to simultaneously examine multiple data sets; and
searching for an intersection by joining parameters common to each data set, by joining search spaces of each data set.

8. The method of claim 1, wherein any one of the plurality of related search parameters is removable as a parameter of the plurality of related search parameters by dragging an element corresponds to the one of the plurality of related search parameters in a direction away from a perimeter of the search space.

9. A system for an interactive graphical search interface, the system comprising:
a memory; and
a server module configured on the memory and configured to:
identify, from a search engine database, a plurality of related search parameters based on one or more initial search parameters;
generate, by a processor, a search space containing a plurality of elements, wherein each of the elements of the plurality of elements corresponds to one of the one or more initial search parameters and plurality of related search parameters, and wherein the plurality of elements allow adjustments to a weighting of one or more of the one or more initial search parameters and the plurality of related search parameters by interacting with one or more of the elements;
transmit a graphical interface projecting a representation of the search space; and
transmit a plurality of search results automatically updated in real time based on adjustments to the weighting of the one or more initial search parameters and the plurality of related search parameters, wherein each of the plurality of elements is movable toward or away from a center of the search space to adjust the weighting of the one or more initial search parameters and the plurality of related search parameters,
wherein, initially, one or more of the initial search parameters and the plurality of related search parameters are weighted equally, such that the search space is a radially symmetric shape about an optimal search output.

10. The system of claim 9, wherein distances from the plurality of elements to the center of the search space are initially equal.

11. The system of claim 9, wherein distances between the plurality of elements are initially equal.

12. The system of claim 9, wherein a perimeter of the search space has a plurality of vertices, each vertex of the plurality of vertices representing one of the one or more initial search parameters and the plurality of related search parameters.

13. The system of claim 9, wherein each of the one or more elements is a vertex of a plurality of parameter vertices in the search space, and distances of parameter vertices to the center of the search space represent the weighting of each of the one or more initial search parameters and plurality of related search parameters.

14. The system of claim 9, wherein the center of the search space represents an optimal search output.

15. A non-transitory computer-readable medium including contents that are configured to cause a computing system to generate an interactive graphical search interface by performing a method comprising:
identifying, from a search engine database, a plurality of related search parameters based on one or more initial search parameters;
generating, by a processor, a search space containing a plurality of elements, wherein each of the elements of the plurality of elements corresponds to one of the one or more initial search parameters and plurality of related search parameters, and wherein the plurality of elements allow adjustments to a weighting of one or more of the one or more initial search parameters and the plurality of related search parameters by interacting with one or more of the elements;
transmitting a graphical interface projecting a representation of the search space; and
transmitting a plurality of search results automatically updated in real time based on adjustments to the weighting of the one or more initial search parameters and the plurality of related search parameters, wherein each of the plurality of elements is movable toward or away from a center of the search space to adjust the weighting of the one or more initial search parameters and the plurality of related search parameters,
wherein, initially, one or more of the initial search parameters and the plurality of related search parameters are weighted equally, such that the search space is a radially symmetric shape about an optimal search output.

16. The computer-readable medium of claim 15, wherein distances from the plurality of elements to the center of the search space are initially equal.

17. The computer-readable medium of claim 15, wherein distances between the plurality of elements are initially equal.

18. The computer-readable medium of claim 15, wherein a perimeter of the search space has a plurality of vertices, each vertex of the plurality of vertices representing one of the one or more initial search parameters and the plurality of related search parameters.

19. A computer-implemented method for an interactive graphical search interface, the method comprising:
identifying, from a search engine database, a plurality of related search parameters based on one or more initial search parameters;
generating, by a processor, a search space containing a plurality of elements, wherein each of the elements of the plurality of elements corresponds to one of the one or more initial search parameters and plurality of related search parameters, and wherein the plurality of elements allow adjustments to a weighting of one or more of the one or more initial search parameters and the plurality of related search parameters by interacting with one or more of the elements;

transmitting a graphical interface projecting a representation of the search space; and transmitting a plurality of search results automatically updated in real time based on adjustments to the weighting of the one or more initial search parameters and the plurality of related search parameters, wherein each of the plurality of elements is movable toward or away from a center of the search space to adjust the weighting of the one or more initial search parameters and the plurality of related search parameters, wherein each of the one or more elements is a vertex of a plurality of parameter vertices in the search space, and distances of parameter vertices to the center of the search space represent the weighting of each of the one or more initial search parameters and plurality of related search parameters.

20. The method of claim 19, wherein, initially, one or more of the initial search parameters and the plurality of related search parameters are weighted equally, such that the search space is a radially symmetric shape about an optimal search output.

21. A system for an interactive graphical search interface, the system comprising:

a memory; and a server module configured on the memory and configured to:

identify, from a search engine database, a plurality of related search parameters based on one or more initial search parameters;

generate, by a processor, a search space containing a plurality of elements, wherein each of the elements of the plurality of elements corresponds to one of the one or more initial search parameters and plurality of related search parameters, and wherein the plurality of elements allow adjustments to a weighting of one or more of the one or more initial search parameters and the plurality of related search parameters by interacting with one or more of the elements;

transmit a graphical interface projecting a representation of the search space; and transmit a plurality of search results automatically updated in real time based on adjustments to the weighting of the one or more initial search parameters and the plurality of related search parameters, wherein each of the plurality of elements is movable toward or away from a center of the search space to adjust the weighting of the one or more initial search parameters and the plurality of related search parameters, wherein each of the one or more elements is a vertex of a plurality of parameter vertices in the search space, and distances of parameter vertices to the center of the search space represent the weighting of each of the one or more initial search parameters and plurality of related search parameters.

22. The system of claim 21, wherein, initially, one or more of the initial search parameters and the plurality of related search parameters are weighted equally, such that the search space is a radially symmetric shape about an optimal search output.

* * * * *